(12) United States Patent
Zhou et al.

(10) Patent No.: US 8,995,281 B2
(45) Date of Patent: Mar. 31, 2015

(54) LOGGED DRIVE TEST REPORTING

(75) Inventors: Wei Hua Zhou, Beijing (CN); Yi Zhang, Beijing (CN); Malgorzata Tomala, Nowe Miasto nad Pilica (PL)

(73) Assignee: Nokia Solutions and Networks Oy, Espoo (FI)

( * ) Notice: Subject to any disclaimer, the term of this patent is extended or adjusted under 35 U.S.C. 154(b) by 425 days.

(21) Appl. No.: 12/776,683

(22) Filed: May 10, 2010

(65) Prior Publication Data
US 2011/0276838 A1 Nov. 10, 2011

(51) Int. Cl.
*G01R 31/08* (2006.01)
*H04W 24/08* (2009.01)

(52) U.S. Cl.
CPC .................... *H04W 24/08* (2013.01)
USPC .......................................... 370/241

(58) Field of Classification Search
USPC .............. 379/112.05; 370/241–253, 216–228
See application file for complete search history.

(56) References Cited

U.S. PATENT DOCUMENTS

| | | | | |
|---|---|---|---|---|
| 6,542,841 B1* | 4/2003 | Snyder | | 702/104 |
| 6,822,432 B2* | 11/2004 | Hilleary | | 324/72 |
| 7,430,177 B2* | 9/2008 | Mir et al. | | 370/241 |
| 8,135,882 B2* | 3/2012 | Uchi et al. | | 710/38 |
| 2003/0069876 A1* | 4/2003 | Richardson | | 707/1 |
| 2003/0083842 A1* | 5/2003 | Miller et al. | | 702/122 |
| 2005/0251363 A1* | 11/2005 | Turner et al. | | 702/182 |
| 2006/0104218 A1* | 5/2006 | Kako | | 370/252 |
| 2008/0130517 A1* | 6/2008 | Lee et al. | | 370/254 |
| 2010/0316034 A1* | 12/2010 | Burbidge et al. | | 370/338 |
| 2011/0032889 A1* | 2/2011 | Lee et al. | | 370/329 |
| 2011/0112790 A1* | 5/2011 | Lavie et al. | | 702/123 |
| 2011/0201279 A1* | 8/2011 | Suzuki et al. | | 455/67.11 |
| 2012/0044880 A1* | 2/2012 | Sun et al. | | 370/329 |
| 2012/0044922 A1* | 2/2012 | Ishii | | 370/338 |
| 2012/0163338 A1* | 6/2012 | Zhang et al. | | 370/331 |

OTHER PUBLICATIONS

Ericsson: "Triggers for logged MDT measurement reporting R2-101426", Feb. 22, 2010, 3GPP TSG RAN WG2 Meeting 69 San Francisco, USA,, pp. 1-3, XP002629991.
3GPP TSG RAN2 #69 bis meeting, "Introduction of Idle Mode Measurements", 3 pages, R1-102358 (Apr. 12-Apr. 16, 2010).
3 GPP TSG RAN WG2 #69 bis, "Procedure for Logged MDT in Idle", (3 pages), R2-102292 (Apr. 12-Apr. 16, 2010).
3GPP TSG-WG2 Meeting #69bis, "UE Power Consumption Considerations on Idle Logging for Drive Test Minimisation" (4 pages) Apr. 12-Apr. 16, 2010).
3Gpp TR 36.805 V.9.0.0 (Dec. 2009), "$3^{rd}$ Generation Partnership Project; Technical Specification Group Radio Access Network",(Release 9 ), (24 pages).

* cited by examiner

*Primary Examiner* — Fan Ng
(74) *Attorney, Agent, or Firm* — Harrington & Smith

(57) ABSTRACT

A network receives from a user equipment UE information about a measurement configuration used to log test measurements; and the network uses the received information to determine further signaling to send to the UE concerning further test measurements. The network can compare the received measurement configuration to a measurement configuration for the further test measurements; and if the same can merely indicate to the UE to continue using the same configuration else if different can indicate to the UE the new configuration to use for the further measurements. The UE logs the test measurements taken in the IDLE mode. After exiting the IDLE mode it sends to the network with which it connects information about the measurement configuration used to collect the measurements. The information can be sent in a RRC Connection Setup Complete message along with an availability indictor that the logged test measurements are available.

15 Claims, 3 Drawing Sheets

LOGGED DRIVE TEST REPORTING

TECHNICAL FIELD

The exemplary and non-limiting embodiments of this invention relate generally to wireless communication systems, methods, devices and computer programs and, more specifically, relate to measurement collecting and reporting in a wireless communication system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
DL downlink (eNB to UE)
eNB EUTRAN Node B (evolved Node B/base station)
EUTRAN evolved UTRAN (LTE)
LTE long term evolution
MDT minimization of drive tests
RRC radio resource control
UE user equipment
UL uplink (UE to eNB)
UTRAN universal terrestrial radio access network In the communication system known as evolved UTRAN (E-UTRAN, also referred to as UTRAN-LTE, E-UTRA or 3.9G), the LTE Release 8 is completed, the LTE Release 9 is being standardized, and the LTE Release 10 is currently under development within the 3GPP. In LTE the downlink access technique is OFDMA, and the uplink access technique is single carrier, frequency division multiple access SC-FDMA, and these access techniques are expected to continue in LTE Release 10.

FIG. 1 shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core, more specifically to a mobility management entity MME and to a serving gateway S-GW. The S1 interface supports a many to many relationship between MMEs/Serving Gateways and the eNBs.

There is a need for the wireless network operator to obtain measurement reports from the DL perspective in order to maintain and optimize network coverage. These are often referred to as drive tests, and networks use them sparingly due to the limited portable power of the mobile devices that collect the DL measurements. This is generally termed as MDT. Further details of drive tests for next generation LTE (generally Release 10 and beyond) may be seen at 3GPP TR 36.805 v9.0.0 (2009-12), which details purposes of drive tests and uses of the parameters that the UEs measure.

Manual drive tests are relatively expensive for the network operators and so consideration is recently given to involving user terminals to automate the underlying data collection function. Currently, in 3GPP there are two MDT reporting approaches: immediate MDT reporting and logged MDT reporting. Immediate MDT reporting means the UE reports the MDT measurements to the eNB immediately when the MDT measurements are taken. Logged MDT reporting means the UE takes its measurements while in the IDLE mode, stores them locally, and reports them when it gets a connection again to the network.

In was agreed in 3GPP that when a UE goes ACTIVE again from an IDLE mode, it will indicate the availability of its locally stored/logged MDT reports to the network. When the network gets this indication, depending on its implementation algorithm it will initiate the UE to report its logged MDT reports to the network. Since the "Availability Indication" simply needs to indicate a binary indication of whether there is or is not logged MDT measurements to report, that availability indication can be as simple as a single bit.

Since logged MDT reporting is not yet well defined, many potential problems are not yet identified.

SUMMARY

The foregoing and other problems are overcome, and other advantages are realized, by the use of the exemplary embodiments of this invention.

In a first aspect thereof the exemplary embodiments of this invention provide a method, comprising: receiving from a user equipment information about a measurement configuration used to log test measurements; and using the received information to determine further signaling to send to the user equipment concerning further test measurements.

In a second aspect thereof the exemplary embodiments of this invention provide an apparatus comprising at least one processor and at least one memory including computer program code. The at least one memory and the computer program code are configured, with the at least one processor, to cause the apparatus at least to: receive from a user equipment information about a measurement configuration used to log test measurements; and use the received information to determine further signaling to send to the user equipment concerning further test measurements.

In a third aspect thereof the exemplary embodiments of this invention provide a computer readable memory storing a program of computer readable instructions that when executed by a processor result in actions comprising: receiving from a user equipment information about a measurement configuration used to log test measurements; and using the received information to determine further signaling to send to the user equipment concerning further test measurements.

In a fourth aspect thereof the exemplary embodiments of this invention provide a method, comprising: logging in a local memory test measurements taken according to a measurement configuration while a user equipment is in an IDLE mode; and after exiting the IDLE mode and connecting to a network, sending to the network information about the measurement configuration.

In a fifth aspect thereof the exemplary embodiments of this invention provide an apparatus comprising at least one processor and at least one memory including computer program code. The at least one memory and the computer program code are configured, with the at least one processor, to cause the apparatus at least to: log in a local memory test measurements taken according to a measurement configuration while a user equipment is in an IDLE mode; and after exiting the IDLE mode and connecting to a network, send to the network information about the measurement configuration.

These and other aspects of the invention are detailed more fully below.

DETAILED DESCRIPTION

Figure 1:
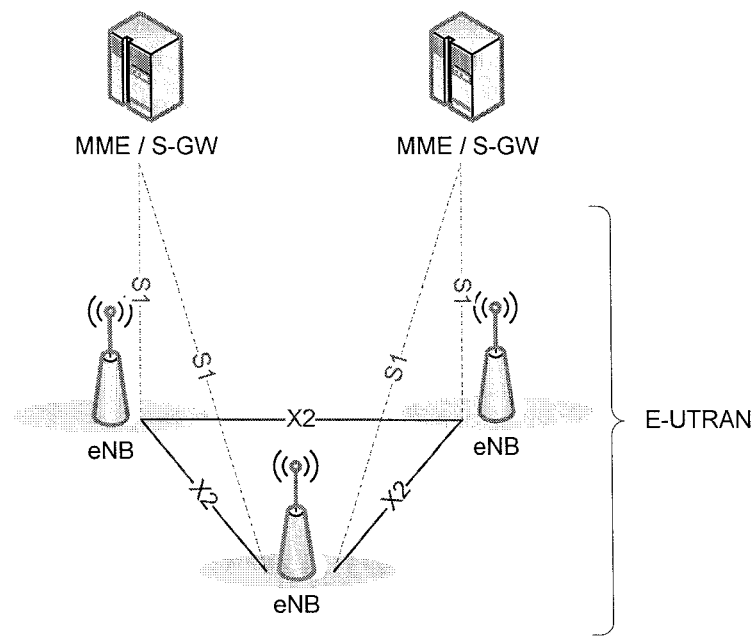
FIG. 1 is a prior art illustration showing the overall architecture of the E-UTRAN system.

One problem in the current approach for logged MDTs is that during IDLE period of UE, especially when the UE stays in the IDLE mode for a relative long time, it is quite likely that the measurement configuration for which the UE was setup for MDT prior to entering the IDLE mode will be changed at the network side due. There are several reasons why the network would want to change the UE's measurement configuration, for example if the operator and/or eNB no longer needs drive tests in the area (due to operations and maintenance OAM requirements) or such test are not in the operator's interest any longer. The measurement configuration may change because congestion causes some limitation to the network performance and based on that impact the network operator or eNB may decide to cease all MDT operations in the affected area. Or it may be that some parameters of the UE's measurement configuration need to be updated, for example if there are new OAM policies or server data, new thresholds, or new types or granularity of measurements to be reported.

Under current understanding, the logged MDT results may be recorded by a UE in the IDLE mode, in which case such measurement configuration changes are not visible to the UE and cannot be implemented until after the UE has logged its data. When the UE has exited the IDLE mode and connected again with the network to report the MDT results is the network's first opportunity to inform the UE about changes to its measurement configuration. But since in current 3GPP understanding the network deletes the UE context when the UE is IDLE, the network is not able to recognize the previous UE configuration.

Even if the measurement configuration is changed only seldom, the affected UE goes into the connected state quite often, and each time it does so the UE indicates to the network the MDT report availability. Where the measurement configuration is not changed while a UE is in IDLE mode, this implies that the network is requesting the report and re-sending the same measurement configuration to the UE, since as noted above the network deletes the UE context when the UE is in the IDLE mode.

Whether the measurement configuration changes or not, the UE reports to the network that it has stored logged MDT reports by sending to the network the "Availability Indication", which as noted above may be a single bit indicating presence or not of MDT data. The network then retrieves the UE's logged MDT results based on the availability indication it receives from that UE, but still the network is unaware of the UE's measurement configuration if the UE was in the IDLE mode.

So regardless of whether the measurement configuration for the UE will stay the same or will be changed, in current understanding of 3GPP the network will try to configure the UE with a MDT measurement configuration every time the UE connects to the network and sends the MDT data it collected while in the IDLE mode, unless the network chooses that the UE will no longer collect MDT data. The inventors see this as a waste of radio resources, particularly in the case where the measurement configuration does not change.

An exemplary but non-limiting embodiment of the invention solves this problem in the following manner. Various embodiments may use some or all of the below techniques. First, besides the "Availability Indication", the UE also reports information of "pre-Measurement Configuration" which was configured for the UE for the logged MDT data that it's reporting. It may be that two eNBs are involved, a first eNB which gave the measurement configuration to the UE by which the UE collected the MDT data, and a second or target eNB to whom the UE is now sending the availability indicator and also reporting that MDT data. In this instance it is the measurement configuration from the first eNB that is the "pre-Measurement Configuration" information that the UE reports to the second/target eNB. Such pre-measurement information may be directly the measurement configuration given by the first eNB, or it may be information about that configuration (such as for example an index into a table that both eNBs store which lists the various measurement configuration options, or some other identifier for the specific measurement configuration that is understood on the network side of the UE-network divide).

Second, based on this "pre-Measurement Configuration" information that the network/eNB receives from the UE, the second eNB may decide to do a re-configuration to the UE for the logged MDT measurements that were collected while the UE was in the IDLE mode, if for example there are configuration parameter changes made during the IDLE period for that UE. The network can then decide whether or not it still wants the already-stored but not yet reported MDT results, and the eNB can signal the UE to send or delete its logged MDT results. The eNB can know whether the configuration is changed or not by comparing the one it wants the UE to use going forward with the configuration the UE reported after exiting the IDLE mode.

Third, if there is no change to the UE's measurement configuration the network can send an indication to the UE whether to continue collecting MDT data using the previous configuration, or discontinue collecting MDT data altogether. That same comparison noted above is the means by which the network knows whether the measurement configuration is changed or not, but if the configuration is not changed then in this case the eNB does not need to signal the measurement configuration itself, only an indication to continue or not continue. If the signal is to discontinue taking MDT measurements, then the UE simply deletes its stored measurement configuration.

Figure 2:
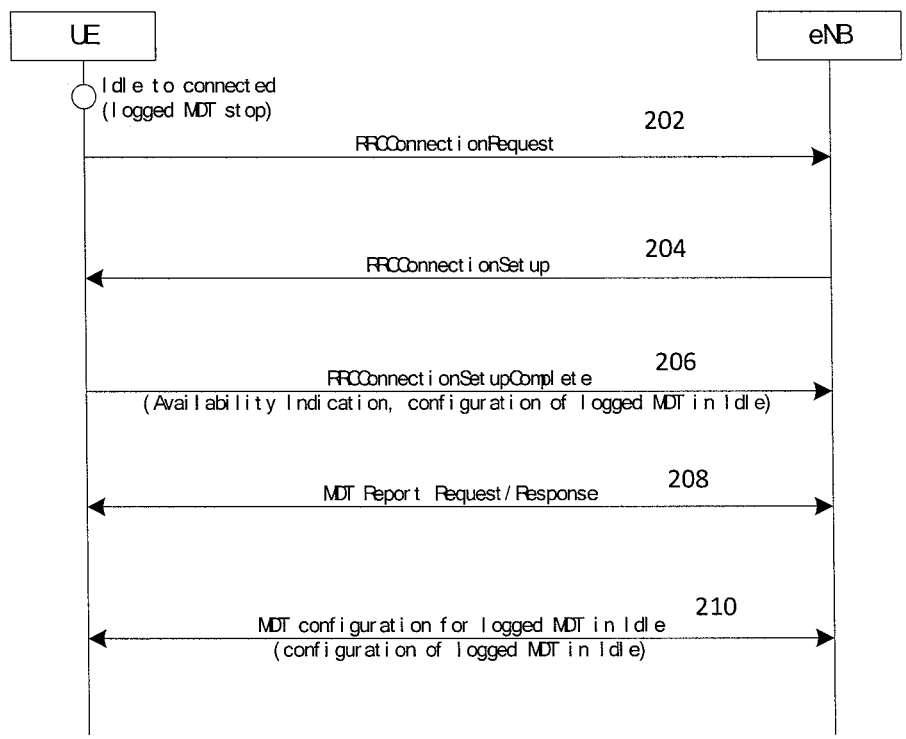
FIG. 2 is a signaling diagram between a UE and an eNB according to an exemplary embodiment of the invention.

FIG. 2 is a signaling diagram between a UE and an eNB showing the above aspects of these exemplary embodiments all together, and assuming there is only one eNB. Time runs from top to bottom in FIG. 2, which begins with the UE changing from IDLE to RRC-Connected mode and having logged MDT results which are not yet reported to the network.

Message 202 is a RRC connection request that the UE sends to the eNB. Message 204 is the eNB's response, a RRC connection setup message. Message 206 is the UE's response, in this embodiment a RRC connection setup complete message. But according to this exemplary embodiment that message 206 also carries the availability indication (which in this embodiment is one bit) and also the information about the measurement configuration under which the UE collected the logged MDT data. Message 206 is the one which carries the "pre-Measurement Configuration" information that was detailed above. Note that at this juncture, the logged MDT data has not yet been communicated to the network.

Message 208 is an exchange between the UE and eNB. If the eNB wants the logged MDT data, this is where the eNB sends its request for that data and where the UE sends the logged data in response to that request. If the eNB no longer wants the data collected under that measurement configuration, this message exchange 208 is where the eNB informs the UE to delete the logged data without sending it (and the UE confirms via an acknowledgement for example).

Between messages 206 and 208 is where the eNB compares the pre-Measurement Configuration information that the eNB received at message 206 with whatever configuration the eNB next wants the UE to use for its next MDT data collection. If they are the same, there is no change to the UE's measurement configuration and in the exchange of messages 210 the eNB informs the UE to continue using its previous configuration for the next MDT data collection. If they are different the eNB sends to the UE in the exchange of messages 210 an indication of the new configuration. If the eNB chooses to discontinue having this UE collect MDT data, it is at message exchange 210 that the eNB informs the UE to delete its measurement configuration. In each case the UE replies for example with an acknowledgement.

Figure 3:
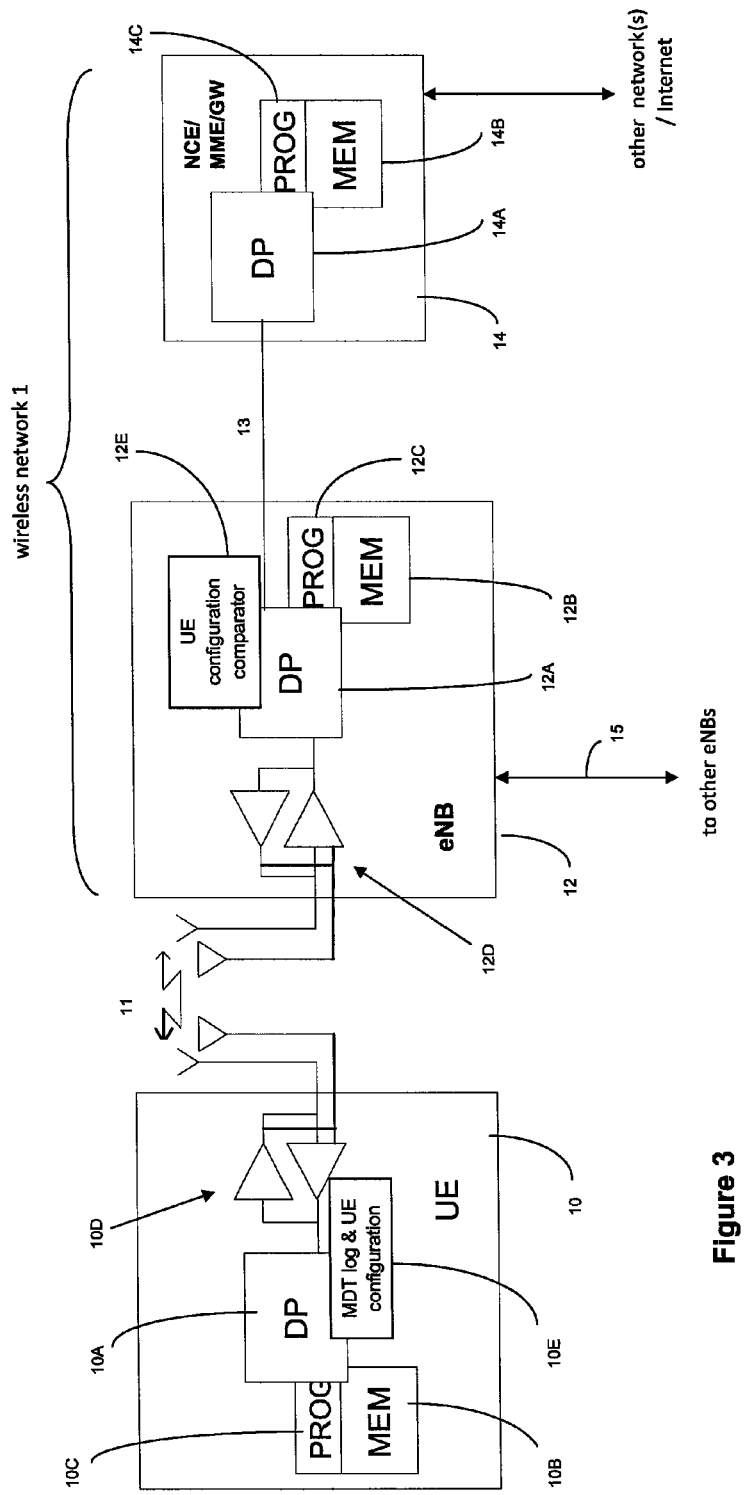
FIG. 3 shows a simplified block diagram of certain apparatus according to various exemplary embodiments of the invention.

Reference is now made to FIG. 3 for illustrating a simplified block diagram of various electronic devices and apparatus that are suitable for use in practicing the exemplary embodiments of this invention. In FIG. 3 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the MME/S-GW functionality shown in FIG. 1, and which provides connectivity with a network, such as a telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 100, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

At least one of the PROGs 100 and 12C is assumed to include program instructions that, when executed by the associated DP, enable the device to operate in accordance with the exemplary embodiments of this invention as was detailed above with respect to FIG. 2.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a MDT log and UE configuration unit 10E which locally stores the logged MDT data and the measurement configuration (or indication thereof) under which that MDT measurement data was collected. Similarly the eNB 12 may also similarly include a UE configuration comparator 12E, which the eNB uses to compare the pre-measurement configuration information that the eNB received at message 206 of FIG. 2 with whatever configuration the eNB next wants the UE to use for its next MDT data collection.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Note that the various DPs 10A, 12A may be implemented as one or more processors/chips, either or both of the UE 10 and the eNB 12 may include more than one transceiver 10D, 12D, and particularly the eNB 12 may have its antennas mounted remotely from the other components of the eNB 12, such as for example tower-mounted antennas.

Figure 4A:
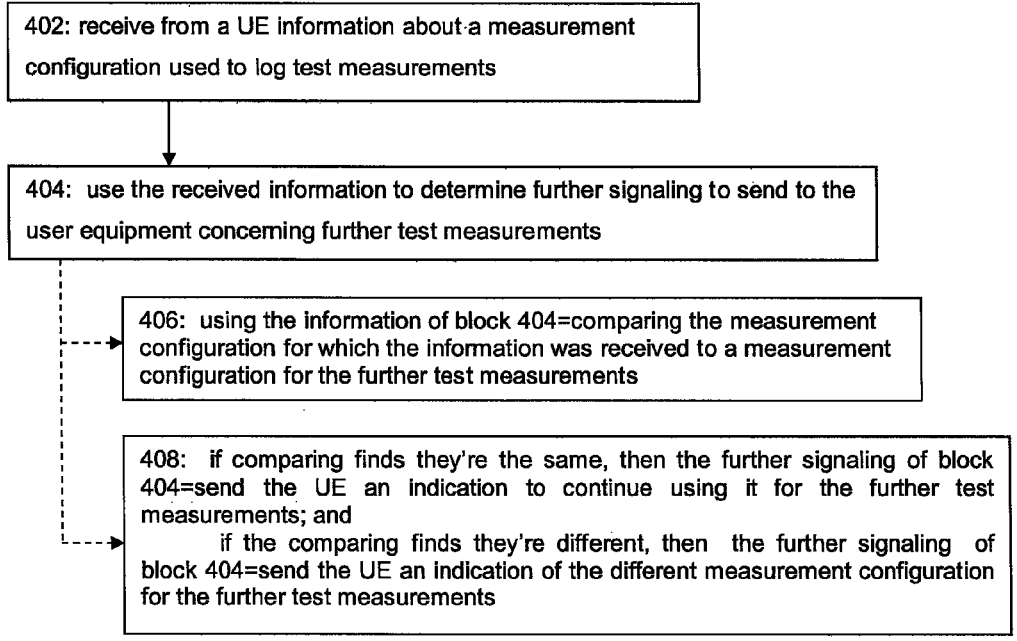
FIGS. 4A-B are each a logic flow diagram that illustrates the operation of a method, and a result of execution of computer program instructions embodied on a computer readable memory, in accordance with the exemplary embodiments of this invention from the perspectives of a network element and of a user equipment, respectively.

FIG. 4A is a logic flow diagram that illustrates the operation of a method, and a result of execution of computer program instructions, in accordance with the exemplary embodiments of this invention from the perspective of a network element such as for example the eNB/access node. Dashed lines indicate optional elements. In accordance with these exemplary embodiments at block 402 the network element receives from a UE information about a measurement configuration used to log test measurements, and at block 404 uses the received information to determine further signaling to send to the user equipment concerning further test measurements.

Further at FIG. 4A, block 406 shows that using the information at block 404 more particularly means comparing the measurement configuration for which the information was received to a measurement configuration for the further test measurements. Block 408 gives options for the results of that comparing at block 406. If the comparing finds they are the same measurement configurations, then the further signaling of block 404 means send to the UE an indication to continue using that measurement configuration for the further test measurements. If instead the comparing finds they two measurement configurations are different, then the further signaling noted for block 404 means to send to the UE an indication of the different measurement configuration for the further test measurements.

Figure 4B:
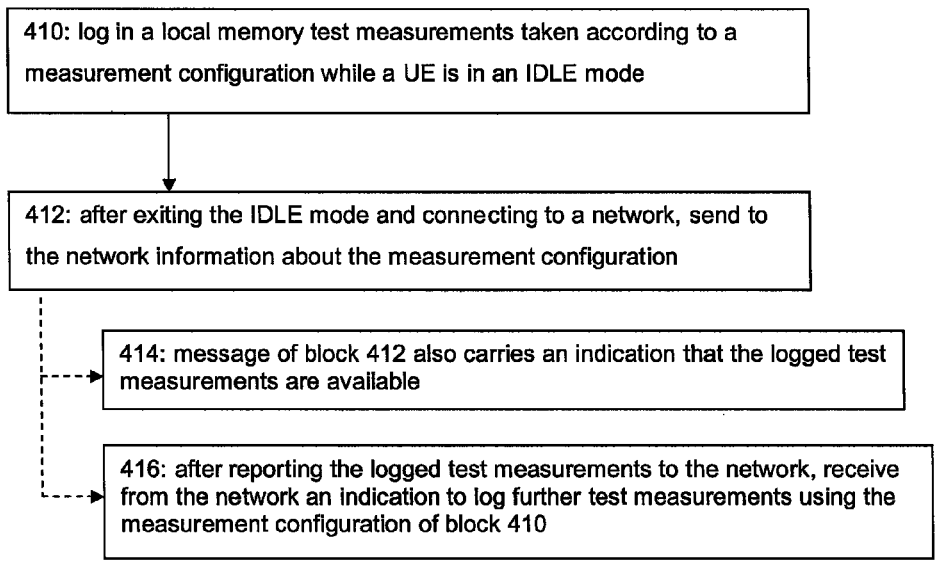

FIG. 4B is a logic flow diagram that illustrates the operation of a method, and a result of execution of computer program instructions, in accordance with the exemplary embodiments of this invention from the perspective of a user equipment. Again, dashed lines indicate optional elements. In accordance with these exemplary embodiments at block 410 the UE logs in its local memory test measurements taken according to a measurement configuration while the UE is in an IDLE mode. At block 412, after exiting the IDLE mode and connecting to a network the UE sends to the network information about the measurement configuration.

Further at FIG. 4B at block 414 the information of block 412 is sent in a message that also carries an indication that the logged test measurements are available, the "Availability Indication" noted above. At block 416, after reporting the logged test measurements to the network the UE receives from the network an indication to log further test measurements using the measurement configuration that was mentioned in block 410.

The various blocks shown in FIGS. 4A-B may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, while the exemplary embodiments have been described above in the context of advancements to the 3GPP LTE system, it should be appreciated that the exemplary embodiments of this invention are not limited for use with only this one particular type of wireless communication system.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:

1. A method, comprising:
receiving, at an access node, from a user equipment a message comprising information about a measurement configuration used to configure logged measurements at the user equipment;
determining, by the access node, using the received information about the measurement configuration used to configure logged measurements at the user equipment and a measurement configuration of the access node for the determination further signaling to send to the user equipment concerning further configuring of logged measurements at the user equipment; and
sending, by the access node, to the user equipment the further signaling concerning the further configuring of logged measurements at the user equipment.

2. The method according to claim 1, in which the determining comprises comparing the measurement configuration used to configure the logged measurements at the user equipment for which the information was received to the measurement configuration of the access node for the further configuring of logged measurements.

3. The method according to claim 2, in which:
if the comparing finds the measurement configuration used to configure the logged measurements at the user equipment for which the information was received is the same as the measurement configuration of the access node for the further configuring of logged measurements, then the further signaling comprises an indication for the user equipment to continue using the measurement configuration used to configure the logged measurements at the user equipment for which the information was received for the further configuring of logged measurements at the user equipment; and
if the comparing finds the measurement configuration used to configure the logged measurements at the user equipment for which the information was received is different than the measurement configuration of the access node for the further measurements, then the further signaling comprises an indication of the different measurement configuration of the access node for the further configuring of logged measurements.

4. The method according to claim 1, further comprising sending to the user equipment, after receiving the information about the measurement configuration used to configure the logged measurements, a request for the user equipment to send the logged measurements.

5. The method according to claim 1, in which the logged measurements comprise minimization of drive tests measurements.

6. An apparatus, comprising:
at least one processor; and
at least one memory including computer program code;

the at least one memory and the computer program code configured to, with the at least one processor, cause the apparatus at least to:

receive, at an access node, from a user equipment a message comprising information about a measurement configuration used to configure logged measurements at the user equipment;

determine, by the access node, using the received information about the measurement configuration used to configure logged measurements at the user equipment and a measurement configuration of the access node for the determination, further signaling to send to the user equipment concerning further configuring of the logged measurements at the user equipment; and send, by the access node, to the user equipment the further signaling concerning the further configuring of logged measurements at the user equipment.

7. The apparatus according to claim 6, in which the at least one memory and the computer program code is configured to, with the at least one processor, cause the apparatus to use the received information by at least comparing the measurement configuration used to configure the logged measurements at the user equipment for which the information was received to the measurement configuration of the access node for the further configuring of logged measurements at the user equipment.

8. The apparatus according to claim 7, in which:

if the comparing finds the measurement configuration used to configure the logged measurements at the user equipment for which the information was received is the same as the measurement configuration of the access node for the further configuring of logged measurements, then the further signaling comprises an indication for the user equipment to continue using the measurement configuration used to configure the logged measurements at the user equipment for which the information was received for the further configuring of logged measurements; and if the comparing finds the measurement configuration used to configure the logged measurements at the user equipment for which the information was received is different than the measurement configuration of the access node for the further configuring of logged measurements, then the further signaling comprises an indication of the different measurement configuration of the access node for the further configuring of logged measurements.

9. The apparatus according to claim 6, in which the at least one memory and the computer program code is configured to, with the at least one processor, cause the apparatus to further send to the user equipment, after receiving the information about the measurement configuration used to configure the logged measurements, a request for the user equipment to send the logged measurements.

10. The apparatus according to claim 9, in which the further signaling is sent after receiving the logged measurements.

11. A non-transitory computer readable memory storing a program of computer readable instructions that when executed by a processor result in actions comprising:

receiving, at an access node, from a user equipment a message comprising information about a measurement configuration used to configure logged measurements at the user equipment; and determining, by the access node, using the received information about the measurement configuration used to configure the logged measurements at the user equipment and a measurement configuration of the access node for the determination, further signaling to send to the user equipment concerning further configuring of logged measurements at the user equipment; and sending, by the access node, to the user equipment the further signaling concerning the further configuring of logged measurements at the user equipment.

12. The non-transitory computer readable memory according to claim 11, in which the determining comprises comparing the measurement configuration used to configure the logged measurements at the user equipment for which the information was received to the measurement configuration of the access node for the further configuring of logged measurements.

13. The non-transitory computer readable memory according to claim 11, in which if the comparing finds the measurement configuration used to configure the logged measurements at the user equipment for which the information was received is the same as the measurement configuration of the access node for the further configuring of logged measurements, then the further signaling comprises an indication for the user equipment to continue using the measurement configuration used to configure the logged measurements at the user equipment for which the information was received for the further configuring of logged measurements; and if the comparing finds the measurement configuration used to configure the logged measurements at the user equipment for which the information was received is different than the measurement configuration of the access node for the further configuring of logged measurements, then the further signaling comprises an indication of the different measurement configuration of the access node for the further configuring of logged measurements.

14. The non-transitory computer readable memory according to claim 11, in which the information is received in a radio resource control connection setup complete message and the further signaling is sent after receiving the logged measurements.

15. The non-transitory computer readable memory according to claim 11, further comprising sending to the user equipment, after receiving the information about the measurement configuration used to configure the logging measurements, a request for the user equipment to send the logged measurements.

* * * * *